United States Patent
Sosna et al.

(10) Patent No.: US 12,117,977 B1
(45) Date of Patent: Oct. 15, 2024

(54) SYSTEMS AND METHODS FOR PLATFORM INDEPENDENT SECURE CUSTOMER DATA MIGRATION

(71) Applicant: Veeva Systems Inc., Pleasanton, CA (US)

(72) Inventors: Arno Sosna, Pleasanton, CA (US); Alan Wang, Dublin, CA (US); Kai Feng, Santa Clara, CA (US)

(73) Assignee: Veeva Systems Inc., Pleasanton, CA (US)

( * ) Notice: Subject to any disclaimer, the term of this patent is extended or adjusted under 35 U.S.C. 154(b) by 0 days.

(21) Appl. No.: 18/356,788

(22) Filed: Jul. 21, 2023

(51) Int. Cl.
*G06F 16/00* (2019.01)
*G06F 16/21* (2019.01)
*G06F 16/2453* (2019.01)

(52) U.S. Cl.
CPC .......... *G06F 16/214* (2019.01); *G06F 16/213* (2019.01); *G06F 16/24542* (2019.01)

(58) Field of Classification Search
CPC . G06F 16/214; G06F 16/24542; G06F 16/213

USPC ........................................................ 707/715
See application file for complete search history.

(56) References Cited

U.S. PATENT DOCUMENTS

| | | | |
|---|---|---|---|
| 2017/0272419 A1* | 9/2017 | Kumar | H04L 63/06 |
| 2021/0256033 A1* | 8/2021 | Huang | G06F 16/258 |

* cited by examiner

*Primary Examiner* — Chelcie L Daye

(57) ABSTRACT

Systems and methods for platform independent secure customer data migration from one data storage to another data storage. A synchronization server includes a translation layer and an authentication layer. The translation layer encodes data from one data storage access language and schema to another distinct data storage access language and schema. Before the full transition to the second data storage, the translation layer also encodes, updates and inserts data into the first data storage. Existing references to the first data storage as well as new references to the second data storage are supported using an authentication layer. After a request for secure customer data, a determination is made which data storage is accessed from an obtained authentication factor. When the second data storage is accessed, the translation layer is employed to encode the first data storage object references to the corresponding second data storage object.

19 Claims, 5 Drawing Sheets

400

401 START

403 Establish optimum execution of first data storage access by parsing a set of queries using an optimization component and extracting a list of key value pairs.

405 Analyze and generate a hierarchical representation of the set of queries to define the structure of the first access language 407 Encode the set of queries into encoded data in the second access language associated with the second data storage.

409 Analyze and generate a hierarchical representation of the encoded set of queries to define the structure of the second access language 411 Obtain additional second data storage information and generate a translated set of queries in the second access language 413 Forward the generated translated set of queries in the second access language to a data encoding interface

415 END

FIG. 4

500

501 START

503 User logs in to the CRM and credentials are authenticated to provide access to the CRM subsystem 505 Obtain authentication factor regarding request for secure customer data from the CRM server 507 Establish data authentication interface to communicate between different client platforms and various data storage subsystems

511

509 Determine which data storage subsystem to access

Utilize the data authentication interface to extract the secure customer data and communicate with various platforms 513 Dependency inject the translation layer 515 Utilize the data authentication interface to extract the secure customer data and communicate with various platforms

517 END

FIG. 5

SYSTEMS AND METHODS FOR PLATFORM INDEPENDENT SECURE CUSTOMER DATA MIGRATION

TECHNICAL FIELD

The present disclosure relates generally to systems and methods that provide for platform independent migration of secure customer data, wherein the secure customer data includes at least customer system configuration data and customer account data from one data storage to another data storage, including methods and systems for synchronization, translation, and authentication of secure customer data.

BACKGROUND

Data storage systems contain large amounts of data. This data may include personal data, customer/client/patient data, health-related data, and much more. Data migration is a key consideration for any system implementation, upgrade or consolidation. Even a seemingly straightforward data migration can be costly, time consuming and resource intensive. Presently there are data migration solutions that provide the ability to integrate data from multiple sources into common data warehouses. For some, ingesting new data into an analytical warehouse is a daily routine occurrence. However, the solutions for data migrations between platforms are more limited. Different platforms may have distinct database schemas, distinct database structures, distinct access languages, distinct syntax, etc., which requires bespoke solutions for migrating data between platforms while keeping in consideration the speed and performance of execution. There is a need for a system for data migration that overcomes the above problems, as well as one that provides additional benefits.

SUMMARY

Embodiments disclosed in the present document provide machine-implemented method for platform independent migration of secure customer data between a first data storage and a second data storage. The method comprises: establishing the first data storage, wherein the first data storage includes a first database schema and a first access language; establishing the second data storage, wherein the second data storage includes a second database schema and a second access language, wherein the first data storage is distinct from the second data storage, the first database schema is distinct from the second database schema, and the first access language is distinct from the second access language; establishing optimum execution of first data storage access by parsing a set of queries in the first access language using an optimization component and evaluating interdependencies to reduce query processing time and resource utilization; analyzing the set of queries in the first access language and generating a hierarchical representation of the set of queries to define the structure of the first access language; encoding the set of queries into encoded query data in the second access language associated with the second data storage; analyzing the encoded query data and generating a hierarchical representation of the encoded query data to define the structure of the second access language; obtaining additional second data storage information and combining with the hierarchical representation of the second access language to generate a translated set of queries in the second access language; sending the translated set of queries in the second access language to a data encoding interface to execute the migration of secure customer data from the first data storage to the second data storage.

Embodiments disclosed in the present document provide a system for platform independent migration of secure customer data. The system comprises: a first data storage, wherein the first data storage includes a first database schema and a first access language; a second data storage, wherein the second data storage includes a second database schema and a second access language, wherein the first data storage is distinct from the second data storage, the first database schema is distinct from the second database schema, and the first access language is distinct from the second access language; a translation controller that establishes optimum execution of first data storage access by parsing a set of queries using an optimization component and analyzing interdependencies to reduce query processing time and resource utilization; analyzes the set of queries in the first access language and generates a hierarchical representation of the set of queries to define the structure of the first access language; encodes the set of queries into encoded data in the second access language associated with the second data storage; analyzes the encoded data in the second access language and generates a hierarchical representation of the encoded set of queries to define the structure of the second access language; obtains additional second data storage information and combines the hierarchical representation of the encoded data in the second access language to generate a translated set of queries in the second access language; and sends the translated set of queries in the second access language to a data encoding interface to execute the migration of secure customer data from the first data storage to the second data storage.

Embodiments disclosed in the present document provide a machine-implemented method for authentication during platform independent migration of secure customer data between a first data storage and a second data storage. The method comprises: establishing the first data storage, wherein the first data storage includes a first database schema and a first access language; establishing the second data storage, wherein the second data storage includes a second database schema and a second access language, wherein the first data storage is distinct from the second data storage, the first database schema is distinct from the second database schema, and the first access language is distinct from the second access language; receiving a request for secure customer data from the first data storage or second data storage; obtaining an authentication factor for the request for secure customer data, wherein the authentication factor includes details specifying where the request for secure customer data is trying to access; establishing a data authentication interface to communicate between the first data storage, and second data storage; determining if the request for secure customer data requires accessing the first data storage or the second data storage based on evaluating the obtained authentication factor; extracting the requested secure customer data from the second data storage after determination that the request for secure customer data requires accessing the second data storage by referencing the encoded data object of the second data storage associated with the equivalent data object of the first data storage; providing the requested secure customer data from the second data storage using the data authentication interface.

Embodiments disclosed in the present document provide a system for authentication during platform independent migration of secure customer data between a first data storage and a second data storage. The system comprises: a first data storage, wherein the first data storage includes a first database schema and a first access language; a second data storage, wherein the second data storage includes a second database schema and a second access language, wherein the first data storage is distinct from the second data storage, the first database schema is distinct from the second database schema, and the first access language is distinct from the second access language; a data authentication interface controller that establishes a data authentication interface to communicate between the first data storage, and second data storage; an authentication controller that: receives a request for secure customer data from the first data storage or second data storage; obtains an authentication factor for the request for secure customer data, wherein the authentication factor includes details specifying where the request for secure customer data is trying to access; determines if the request for secure customer data requires accessing the first data storage or the second data storage based on evaluating the obtained authentication factor; extract the requested secure customer data from the second data storage after determination that the request for secure customer data requires accessing the second data storage by referencing the encoded data object of the second data storage associated with the equivalent data object of the first data storage; provides the requested secure customer data from the second data storage using the data authentication interface.

Embodiments disclosed in the present document provide a synchronization server for platform independent migration of secure customer data from a first data storage to a second data storage. The synchronization server comprises: a translation controller that: establishes optimum execution of a first data storage access by parsing a set of queries in a first access language using an optimization component and analyzing interdependencies to reduce query processing time and resource utilization; analyzes the set of queries in the first access language and generates a hierarchical representation of the set of queries to define the structure of the first access language; encodes the set of queries into encoded data in a second access language associated with the second data storage; analyzes the encoded data in the second access language and generates a hierarchical representation of the encoded set of queries to define the structure of the second access language; obtains additional second data storage information and combines the hierarchical representation of the encoded data in the second access language to generate a translated set of queries in the second access language; an authentication controller that: receives a request for secure customer data from the first data storage or second data storage; obtains an authentication factor for the request for secure customer data, wherein the authentication factor includes details specifying where the request for secure customer data is trying to access; and determines if the request for secure customer data requires accessing the first data storage or the second data storage based on evaluating the obtained authentication factor.

Embodiments disclosed in the present document provide a synchronization server for platform independent migration of secure customer data from a first data storage to a second data storage. The synchronization server comprises: an authentication controller that: receives a request for secure customer data from the first data storage or second data storage; obtains an authentication factor for the request for secure customer data, wherein the authentication factor includes details specifying where the request for secure customer data is trying to access; determines if the request for secure customer data requires accessing the first data storage or the second data storage based on evaluating the obtained authentication factor; a translation controller that encodes data objects in the first data storage to equivalent encoded data objects in the second data storage when the request for secure customer data requires accessing the second data storage: a data encoding interface controller that executes a translated set of queries in a second access language associated with the second data storage; a data authentication interface controller that provides the requested secure customer data from the second data storage.

BRIEF DESCRIPTION OF THE DRAWINGS

For a more complete understanding of the present application and its advantages, references are now made to the following description taken in conjunction with the accompanying drawings, in which like reference numbers indicate like features.

FIG. 4 illustrates an exemplary flow diagram of translation of secure customer data from the first data storage subsystem to the second data storage subsystem according to one embodiment of the present invention;

FIG. 5 illustrates an exemplary flow diagram of authentication of secure customer data according to one embodiment of the present invention.

Although similar reference numbers may be used to refer to similar elements for convenience, it can be appreciated that each of the various example embodiments may be considered to be distinct variations.

Figure 1:
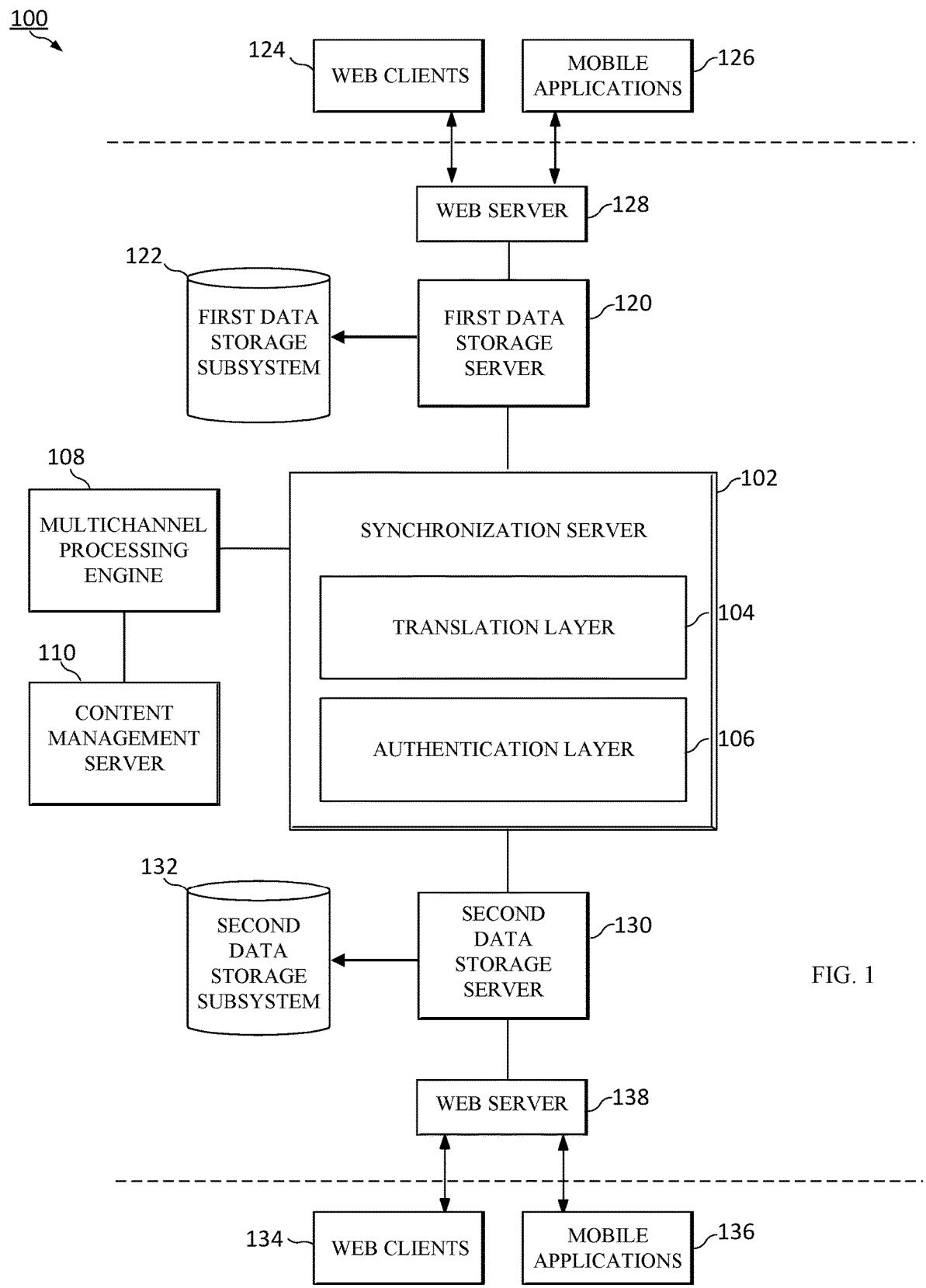
FIG. 1 illustrates an exemplary architecture for platform independent secure customer data migration.

The present embodiments will now be described hereinafter with reference to the accompany drawings, which form a part thereof, and which illustrate example embodiments which may be practiced. As used in the disclosures and the appending claims, the terms "embodiment" and "example embodiment" do not necessarily refer to a single embodiment, although it may, and various example embodiments may be readily combined and interchanged, without departing from the scope or spirit of the present embodiments. Furthermore, the terminology as used herein is for the purpose of describing example embodiments only, and are not intended to be limitations. In this respect, as used herein, the term "in" may include "in" and "on,"

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, well-known structures and components are shown in block diagram form in order to avoid obscuring the concepts of the subject technology.

Embodiments disclosed in the present invention allow for the synchronization, translation, and authentication of secure customer data between existing source data storage and target data storage by providing for a system and method for platform independent secure customer data migration. According to one aspect of the subject technology, a synchronization server may facilitate the efficient migration of secure customer data between a first data storage (e.g., source customer relationship management database) and a second data storage (e.g., target customer relationship management database), wherein the secure customer data includes at least customer system configuration data and customer account data. Contents of the first data storage in a first database schema with a first database access language may be transferred to the second data storage in a second database schema with a second database access language, wherein the first database schema is distinct from the second database schema, and the first database access language is distinct from the second database access language.

The first and second data storage subsystems may include customer relationship management (CRM) information including customer profile information and parameters including customer preferences and regulatory limitations or fields that can be used to facilitate compliance with regulatory limitations.

In disclosed embodiments, intelligent and flexible updating of customer account data may be provided within the first data storage subsystem, including such approaches as communicating with third-party systems and sources in order to verify and update customer information in an effective and timely manner, such as by using the collective information gained by managing a cloud-based system/Software-as-a-Service (SaaS) system on behalf of multiple company customers for the disclosed embodiments.

After the data migration from the first data storage to the second data storage, functionality is preserved. The intelligent and flexible updating of customer account data may be provided within the second data storage subsystem, including such approaches as communicating with third-party systems and sources in order to verify and update customer information in an effective and timely manner, such as by using the collective information gained by managing a cloud-based system/Software-as-a-Service (SaaS) system on behalf of multiple company customers for the disclosed embodiments.

According to another aspect of the subject technology, a translation layer may facilitate the encoding of data from the first data storage subsystem to the second data storage subsystem. When the first database schema is distinct from the second database schema, and the first database access language is distinct from the second database access language, special handing is required to map an object from the first data storage to an equivalent object on the second data storage. The translation layer may encode the first data storage object identifiers to the second data storage object identifiers to convert the first data storage data model to the equivalent second data storage data model.

According to another aspect of the subject technology, an authentication layer may facilitate the seamless combined functioning of existing systems accessing data from the first data storage subsystem and updated systems accessing data from the second data storage subsystem. Determination may be made whether the first data storage subsystem or the second data storage subsystem is queried. When the second data storage subsystem is queried, the translation layer may be utilized to access the first data storage equivalent data object in the second data storage subsystem.

FIG. 1 is a system overview illustrating an embodiment of a platform independent secure customer data migration system 100. The presently disclosed embodiment comprises a synchronization server 102, first data storage server 120, second data storage server 130, multichannel processing engine 108, and content management server 110. The synchronization server 102 may be coupled to the first data storage server 120, the second data storage server 130, and multichannel processing engine 108. The first data storage server 120 may provide access to a first data storage subsystem 122. In one embodiment, the first data storage subsystem 122 may be a customer relationship management subsystem. The customer relationship management subsystem may be operated by a third party. The second data storage server 130 may provide access to a second data storage subsystem 132. In one embodiment, the second data storage subsystem 132 may be a customer relationship management subsystem. The customer relationship management subsystem may be operated by a third party. The multichannel processing engine 108 may be accessed by users such as company sales representatives through web clients 124, 134 or through mobile apps 126, 136 (such as IOS, Android, Blackberry, or Windows Mobile systems), communicating with the multichannel processing engine 108 through web servers 128, 138. Although the users may be described in the present application as being company sales representatives, this particular described embodiment is not intended to limit the generality of the claims that may eventually issue in patents stemming from the present disclosure. In some embodiments, the mobile applications 126, 136 may communicate directly with the synchronization server 102 without going through the web server 128, 138.

The synchronization server 102 comprises a translation layer 104 and an authentication layer 106. The translation layer 104 may facilitate the encoding of data from the first data storage subsystem to the second data storage subsystem and will be described in further detail below in FIG. 2. The authentication layer 106 may facilitate the seamless combined functioning of existing systems accessing data from the first data storage subsystem and updated systems accessing data from the second data storage subsystem and will be described in further detail below in FIG. 3.

The customer relationship management subsystem (e.g. first data storage system 122, second data storage system 132) contains all professional information of health care providers (HCPs) that may be available to users, including contact information, licensing information, areas of practice, and specialties. In addition, the customer relationship management subsystem may also be capable of storing configurations regarding specific preferences, regulatory limitations and requirements, and other fields that will facilitate the generation of appropriate approved electronic communications, in general or on a by recipient basis. These preferences and/or requirements include both the preferences of the user (e.g., maintaining account lists) as well as the preferences of the enterprise (e.g., employers of the users). In other examples, the customer relationship management subsystem may have a content management subsystem and may provide approved content and templates of approved communications.

In this embodiment, the customer relationship management subsystem (e.g. first data storage system 122, second data storage system 132) is capable of communication with multiple sources through the customer relationship management server (e.g., first data storage server 120, second data storage server 130) or through other channels to maintain a current and accurate collection of information regarding customer accounts. The interface with the multiple sources can be, for example, through an Applications Programming Interface or API, as the API interface will allow compatibility with a flexible array of third-party provider servers. The information being updated may include, but is not limited to, licensing information, area of practice, and location of the various customer contacts. In this manner, the customer relationship management subsystem pulls the approved version of what represents an account or physician, which then pulls from multiple networks to ensure that the information regarding an account is up-to-date. The customer relationship management subsystem may also be used to determine the type of domain an email communication is delivered through. A recipient in Spain may receive an email from "Companyx.es, whereas a recipient in Germany would receive the same email from "Companyx.ge." This may allow for additional branding options for the company controlling and sending the electronic communications.

With further reference to the customer relationship management subsystem (e.g. first data storage system 122, second data storage system 132), this system may be a cloud-based customer database that provides a central access to store and distribute consistent data across customer companies as well as their possible third-party partners and agencies that are used to keep this data updated. This system can provide standard data formats and provide an easy and automated way for customers (e.g. pharmaceutical companies) and/or users (e.g. pharmaceutical reps) to have access to coordinated and frequently updated CRM data and to use that coordinated data for sending approved electronic communications in accordance with the system described herein. In an embodiment, the multichannel processing engine 108 is responsible for combining the customer account information from the customer relationship management subsystem with content available from a controlled content repository. Within the customer relationship management subsystem, customer accounts may be assigned a set of alignment rules which determine specific pieces of content that are available for use from the controlled content repository. The multichannel processing engine 108 may apply these rules and supply the user with a list of approved communication templates and pieces of content that may then be used to construct a tailored approved communication.

Communication between the multichannel processing engine 108 and the customer relationship management subsystem (e.g. first data storage system 122, second data storage system 132) may occur via the customer relationship management server (e.g., first data storage server 120, second data storage server 130), which acts as an interface between the two. The customer relationship management server (e.g., first data storage server 120, second data storage server 130) may act solely as an entry and exit point for the customer relationship management subsystem (e.g. first data storage system 122, second data storage system 132). The user may access the multi-channel processing engine 108 through either a Web Client 124, 134 or through the mobile apps 126,136 (such as IOS, Android, Blackberry, or Windows Mobile systems).

In one implementation, the content management server 110 may be a multi-tenant system where various elements of hardware and software may be shared by one or more customers. For instance, a server may simultaneously process requests from a plurality of customers. In a multi-tenant system, a user is typically associated with a particular customer. For instance, a user could be an employee of one of a number of pharmaceutical companies which are tenants, or customers. In one embodiment, the content management server may run on a cloud computing platform.

Figure 2:
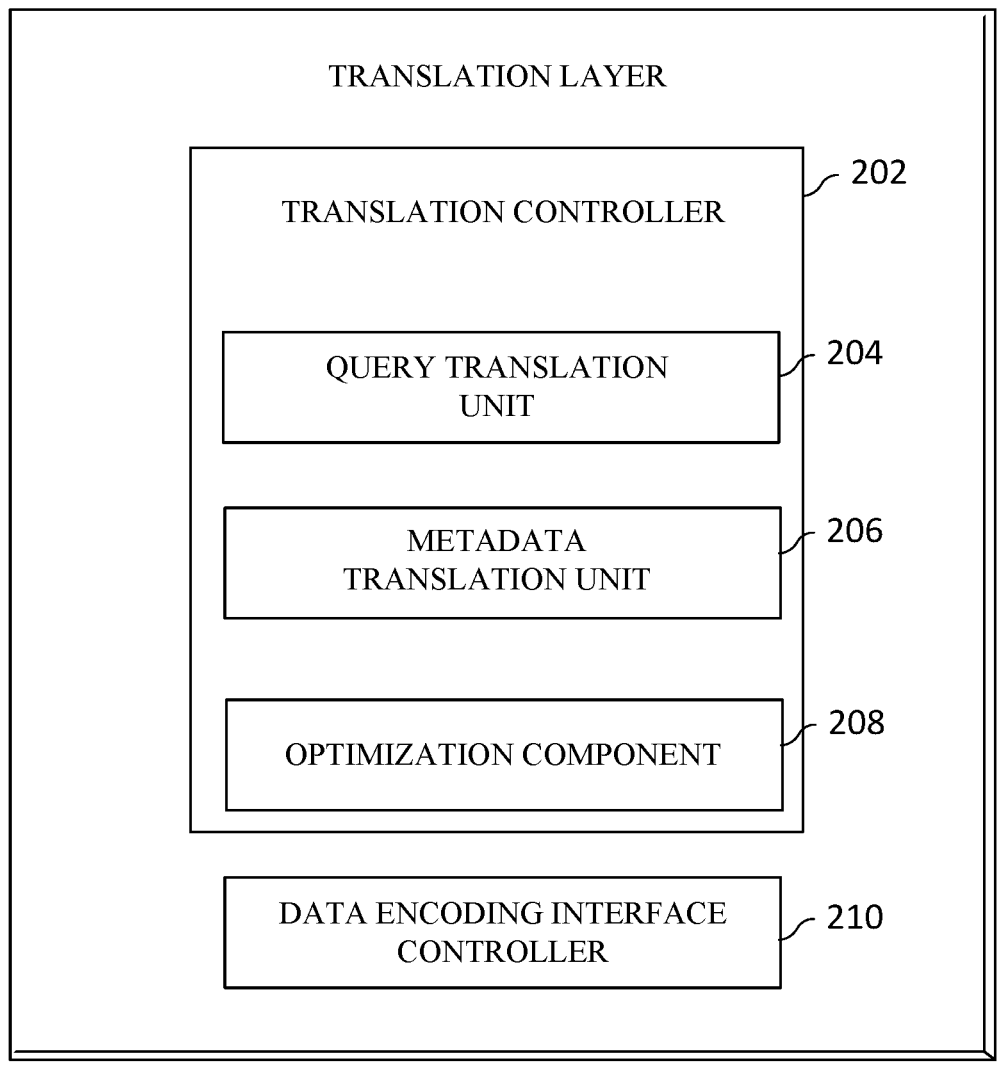
FIG. 2 illustrates an example architecture for the translation layer of the synchronization server according to one embodiment of the present invention.

FIG. 2 is a system overview illustrating an embodiment of a translation layer 104 in the synchronization server 102 of the platform independent secure customer data migration system 100. The presently disclosed translation layer 104 comprises a translation controller 202 and data encoding interface controller 210. The translation controller 202 includes a query translation unit 204, metadata translation unit 206, and optimization component 208. The optimization component 208 evaluates many different attributes of a given query and determines the most efficient method to execute the query in the shortest possible time. The attributes may include number of tables involved, whether indexes are available, number of storage accesses, what type of expressions are involved, etc. In one implementation, the data encoding interface controller 210 in the translation layer 104 may control the process for extracting data and migrating to the second data storage subsystem, as will be described with reference to FIG. 4 below.

The present invention allows users to migrate data from a first data storage subsystem to a second data storage subsystem, so that existing references to the first data storage subsystem as well as new references to the second data storage subsystem are supported. A data encoding interface may be used to map the first data storage object to the second data storage object. The data encoding interface may have code in a programming language for describing the data storage objects structure and design, which may be, e.g., JavaScript code for specifying the objects and fields users are able to query to obtain the customer account data. The customer account data is returned to the data encoding interface in JSON format.

The present invention provides an application programming interface ("API") which may communicate with the JavaScript in the data encoding interface and then extract data and objects in the first data storage system 122 and second data storage system 132.

The data encoding interface controller 210 may facilitate the migration of data from various platforms. The data encoding interface controller 210 of the present invention may be integrated as a portion of the various platform web applications, and live as a child application within these parent applications. In order to make convenient use of the customer data, or data from the first and second data storages, whether it is available through network calls or locally within the parent application, the data access library may expose an API for interacting with the CRM data.

In one implementation, the API may be a unified API which may query various types of data sources across multiple platforms, e.g., iOS, Windows, and the browser for Salesforce online. What a user frequently queries (e.g., the last five calls, most recent calls or all calls submitted) may be packaged up in well formed API calls. The JavaScript may communicate with the API only, and does not have to care about the type of the actual database to be queried. Multiple APIs from multiple providers, utilizing different API styles (e.g., REST, GraphQL, SOAP, RPC, etc.), may send payloads in various data formats (JSON, XLM, etc.) and use different data models. Meeting each providers integration requirements can be made in order to facilitate reliable connections with multiple providers.

In one implementation, the data encoding interface controller 210 may also facilitate the updating and insertion of data from the second data storage system 132 to the first data storage system 122. This supports the interim period before full transition to the second data storage subsystem. Some client systems may still reference the data objects in the first data storage subsystem.

Figure 3:
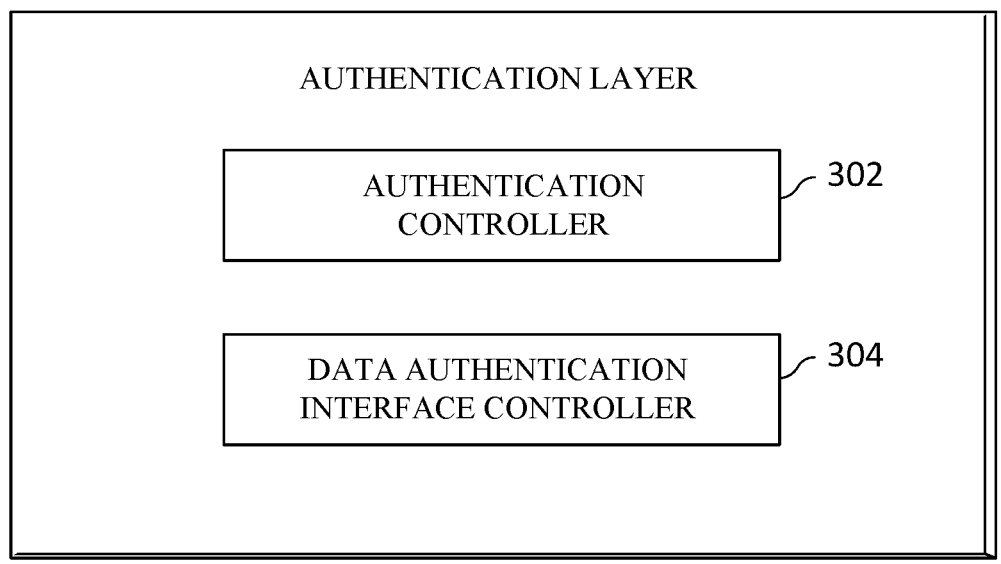
FIG. 3 illustrates an example architecture for the authentication layer of the synchronization server according to one embodiment of the present invention.

FIG. 3 is a system overview illustrating an embodiment of an authentication layer 106 in the synchronization server 102 of the platform independent secure customer data migration system 100. The presently disclosed authentication layer 106 comprises an authentication controller 302 and data authentication interface controller 304. The present invention allows users to migrate data from a first data storage subsystem to a second data storage subsystem, so that existing references to the first data storage subsystem as well as new references to the second data storage subsystem are supported. A data authentication interface may be used to identify whether data is accessed and extracted from the first data storage object or the second data storage object. The data authentication interface controller 304 may have code in a programming language for describing the domain and organization of the data storage objects, which may be, e.g., JavaScript code for specifying the domain of the objects and fields users are able to query to obtain the CRM data.

FIG. 4 illustrates an exemplary flow diagram of translation of data from the first data storage subsystem to the second data storage subsystem according to one embodiment of the present invention. The method begins at step 401. The decision to change or upgrade the source of a customer relationship management subsystem may be made which requires migration of data. First, the translation controller 202 establishes optimum execution of the source data storage (e.g., first data storage subsystem 122) access at 403. In one implementation, the translation controller 202 parses a set of queries using the optimization component 208 and extracts a list of key value pairs. There may be many ways to run a query in a relational database. The translation controller 202 parses every query in the set and calculates how many different ways there are in which the query can run. The optimization component 208 determines the most optimal way to run the query in the shortest possible time.

In one implementation, the optimization component 208 may use a cascade optimization framework to identify the most efficient way to execute a query. Queries are grouped together based on their interdependencies and the framework analyzes the relationships between tables and queries, such as foreign key constraints or join conditions, to determine which queries should be executed. By carefully considering the dependencies between queries, the framework can make informed decisions on query ordering and transformations, thus minimizing overall query processing time and resource utilization by intelligently reordering and combining queries. Cascade optimization frameworks aim to minimize the total execution time by reducing redundant work and maximizing the reuse of intermediate results. In another implementation, the optimization component 208 may utilize cost-based variance to generate a cost function that allows for the most efficient path to be chosen.

At 405, the translation controller 202 analyzes the set of queries and generates a hierarchical representation of the set of queries to define the structure and grammar of the first access language of the first data storage subsystem 122. The hierarchical representation is a more structured and manageable form to analyze, manipulate and encode the first access language of the first data storage subsystem 122. In one implementation, the hierarchical representation may be a tree that represents the syntactic structure of the first access language including the relationships between different elements such as functions, variables, expressions and statements. The translation controller 202 may traverse each node in the tree representation to examine properties such as type, values, and relationships, such that important information of various constructs in the first access language are identified.

At 407, the translation controller 202 encodes the set of queries into encoded data in the second access language associated with the second data storage. In one implementation, the translation controller 202 translates the first storage object identifiers to the second data storage object identifiers to convert the first data storage data model to the equivalent second data storage data model. An identifier may be the name of a data storage object. For example, an identifier may be parts of the database schema such as tables, columns, views, indexes, synonyms, and stored procedure names. The hierarchical representation of the first access language is used to generate symbol tables. Code generation may focus on the rules rather than the elements of statements broken down into their respective parts.

In the current embodiment, the first data storage subsystem may be using SOQL, while the second data storage subsystem may be using VQL. When migrating from SOQL to VQL and maintaining the same data model, there may be object and field names that need to be translated into respective conventions in their VQL counterpart (e.g., "_vod_c"->"_v"). The first data storage object may be converted to the second data storage object by translating to the appropriate identifier.

In one implementation, the translation controller 202 may encode the first data storage data to the second data storage data according to an encoding protocol. The encoding protocol comprises at least a set of rules for translating the names of objects, fields, picklists, etc. of the first data storage to the equivalent in the second data storage. The set of rules may include conversion to respective standard naming conventions.

At 409, the translation controller 202 analyzes the set of queries and generates a hierarchical representation of the set of queries to define the structure and grammar of the second access language of the second data storage subsystem 132. The hierarchical representation is a more structured and manageable form to analyze, manipulate and encode the second access language of the second data storage subsystem 132. In one implementation, the hierarchical representation may be a tree that represents the syntactic structure of the second access language including the relationships between different elements such as functions, variables, expressions and statements.

At 411, the translation controller 202 obtains additional second data storage information and generates the set of queries in the second access language using the second access language hierarchical representation of the set of queries. The second data storage information may include layouts, permissions, security, profiles, messages, account views, settings, and other setup data objects. In one implementation, the second data storage metadata is required for certain functions. The translation controller 202 may also translate the metadata from the first data storage subsystem to the second data storage subsystem. For instance, encoding certain picklist or record type values using certain access language functions requires the additional storage information to encode properly.

In one implementation, the translation controller 202 may encode the first data storage metadata to the second data storage metadata according to a metadata encoding protocol. The first data storage metadata describes the structure of the custom objects that are saved and includes the fields and relationships. The encoding protocol comprises at least a set of rules for translating the names of objects, fields, picklists, etc. of the first data storage to the equivalent in the second data storage. The set of rules may include conversion to respective standard naming conventions. Additional rules may be added via map configuration values and observe a chain of responsibility pattern order. The first and second data storage metadata may be xml-based metadata.

At 413, the translation controller 202 forwards the generated set of queries in the second access language to the data encoding interface controller 210. In one implementation, the data encoding programmable interface executes the queries and migrates the data from the first data storage subsystem 122 to the second data storage subsystem 132. The method ends at 415.

FIG. 5 illustrates an exemplary flow diagram of authentication of secure customer data according to one embodiment of the present invention. The method begins at step 501. After data migration, there may be the situation where some existing client systems access data from the first data storage subsystem and some updated client systems access data from the second data storage subsystem. For instance, in the interim period before full transition to the second data storage subsystem, some client systems may still reference the data objects in the first data storage subsystem. In order to fully transition to the second data storage subsystem, an existing client system may utilize the translation layer described above to access the corresponding data objects in the second data storage subsystem. At 503, a user may login to the CRM (e.g., the first data storage subsystem 122 or the second data storage subsystem 132). The user provided credentials are authenticated by the CRM server (e.g., first data storage server 120 or second data storage server 130) and upon successful authentication access to the CRM is provided.

At 505, there may be a request for data from the CRM (e.g., the first data storage subsystem 122 or the second data storage subsystem 132). The authentication controller 302 obtains an authentication factor regarding the request for information from the CRM server (e.g., the first data storage server 120 or the second data storage server 130). In one implementation, the authentication controller 302 may obtain details specifying where the request for information is trying to access. For instance, the authentication controller 302 may obtain a domain name specifying which organization the request for data is trying to access. This domain name includes the data storage server to communicate with the platform.

At 507, the data authentication interface controller 304 establishes a data authentication interface. In one implementation, the data authentication programmable interface functions to communicate between the different client platforms and the various data storage subsystems (e.g., first data storage subsystem 122, second data storage subsystem 132). The data authentication interface may have code in a programming language for describing the data storage objects structure and design, which may be, e.g., JavaScript code for specifying the objects and fields users are able to query to obtain the CRM data. The CRM data is returned to the data authentication interface in JSON format.

At 509, the authentication controller 302 determines which data storage subsystem to access. In one implementation, the authentication controller 302 analyzes the authentication factor to identify the correct data storage subsystem associated with the request for information from the CRM server. Based on the domain name obtained from the CRM server, the authentication controller 302 can identify the data storage subsystem to access.

In one implementation, each data storage subsystem may be associated with a given organization. The domain name may include the name of the respective data storage subsystem. For example, when the domain name provided by the CRM server includes "Vault.com" or "VaultDev.com", the authentication controller 302 may determine these domain names correspond to the second data storage subsystem 132. Alternatively, when the domain name provided by the CRM server includes "buyer.DomainName.com", the authentication controller 302 may determine this domain name corresponds to the first data storage subsystem 122.

When the authentication controller 302 determines the first data storage subsystem 122 is accessed, the process proceeds to step 511. In one implementation, the data authentication interface may be used by different platforms to communicate with the first data storage subsystem 122. The CRM data in the request for information from CRM is returned to the data authentication interface in JSON format. The process ends at 517.

When the authentication controller 302 determines the second data storage subsystem 132 is accessed, the process proceeds to step 513. Accessing the second data storage subsystem 132 with an existing client system requires utilizing the translation layer described above in conjunction with FIGS. 2, 4 and corresponding supporting sections of the specification. In one implementation, the authentication controller 302 may perform the steps 401-415 of FIG. 4.

At 515, the data authentication interface may be used by different platforms to communicate with the first data storage subsystem 122. The CRM data in the request for data from CRM is returned to the data authentication interface controller 304 in JSON format. The process ends at 517.

While various embodiments have been described above, it should be understood that they have been presented by way of example only, and not limitation. Thus, the breadth and scope of a preferred embodiment should not be limited by any of the above described exemplary embodiments, but should be defined only in accordance with the claims and their equivalents for any patent that issues claiming priority from the present provisional patent application.

In all descriptions of "servers" or other computing devices herein, whether or not the illustrations of those servers or other computing devices similarly show a server-like illustration in the figures, it should be understood that any such described servers or computing devices will similarly perform their described functions in accordance with computer readable instructions stored on a computer-readable media that are connected thereto.

Resources may encompass any types of resources for running instances including hardware (such as servers, clients, mainframe computers, networks, network storage, data sources, memory, central processing unit time, Scientific instruments, and other computing devices), as well as software, software licenses, available network services, and other non-hardware resources, or a combination thereof.

A networked computing environment may include, but is not limited to, computing grid systems, distributed computing environments, cloud computing environment, etc. Such networked computing environments include hardware and Software infrastructures configured to form a virtual organization comprised of multiple resources which may be in geographically disperse locations.

The approved content may be in any format, e.g., text, audio, video, picture, multimedia, or PDF.

Various terms used herein have special meanings within the present technical field. Whether a particular term should be construed as such a "term of art, depends on the context in which that term is used. "Connected to," "in communication with or other similar terms should generally be construed broadly to include situations both where communications and connections are direct between referenced elements or through one or more intermediaries between the referenced elements, including through the Internet or some other communicating network. "Network," "system," "environment," and other similar terms generally refer to networked computing systems that embody one or more aspects of the present disclosure. These and other terms are to be construed in light of the context in which they are used in the present disclosure and as those terms would be understood by one of ordinary skill in the art would understand those terms in the disclosed context. The above definitions are not exclusive of other meanings that might be imparted to those terms based on the disclosed context.

Words of comparison, measurement, and timing such as "at the time." "equivalent," "during," "complete," and the like should be understood to mean "substantially at the time." "substantially equivalent," "substantially during," "substantially complete," etc., where "substantially" means that such comparisons, measurements, and timings are practicable to accomplish the implicitly or expressly stated desired result.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field, such claims should not be limited by the language chosen under this heading to describe the so-called technical field. Further, a description of a technology in the "Background is not to be construed as an admission that technology is prior art to any invention(s) in this disclosure. Neither is the "Brief Summary" to be considered as a characterization of the invention(s) set forth in issued claims. Furthermore, any reference in this disclosure to "invention' in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

The invention claimed is:

1. A computer-implemented method for platform independent migration of secure customer data between a first data storage and a second data storage, comprising:
   establishing the first data storage, wherein the first data storage includes a first database schema and a first access language;
   establishing the second data storage, wherein the second data storage includes a second database schema and a second access language, wherein the first data storage is distinct from the second data storage, the first database schema is distinct from the second database schema, and the first access language is distinct from the second access language;
   establishing optimum execution of first data storage access by parsing a set of queries in the first access language using an optimization component and evaluating interdependencies to reduce query processing time and resource utilization;
   analyzing the set of queries in the first access language and generating a hierarchical representation of the set of queries to define the structure of the first access language;
   encoding the set of queries into encoded query data in the second access language associated with the second data storage;
   analyzing the encoded query data and generating a hierarchical representation of the encoded query data to define the structure of the second access language;
   obtaining additional second data storage information and combining with the hierarchical representation of the second access language to generate a translated set of queries in the second access language; and
   sending the translated set of queries in the second access language to a data encoding interface to execute the migration of secure customer data from the first data storage to the second data storage.

2. The computer-implemented method of claim 1, wherein the first data storage is a customer relationship management (CRM) system.

3. The computer-implemented method of claim 1, wherein the second data storage is a customer relationship management (CRM) system.

4. The computer-implemented method of claim 1, wherein the first access language is SOQL.

5. The computer-implemented method of claim 1, further comprising maintaining the same data model from the first data storage subsystem to the second data storage subsystem.

6. The computer-implemented method of claim 1, wherein the information from the first and second data storage comprises information related to a customer profile, customer preferences or regulatory limitations.

7. The computer-implemented method of claim 1, wherein the optimization component uses a cascade optimization framework.

8. The computer-implemented method of claim 1, wherein the optimization component uses a cost-based variance to generate a cost function for identifying the most efficient path for a query.

9. The computer-implemented method of claim 1, wherein the encoding the set of queries into encoded data in the second access language associated with the second data storage further comprises: converting a first data storage data object identifier to a second data storage data object identifier.

10. The computer-implemented method of claim 1, wherein the encoding the set of queries into encoded data in the second access language associated with the second data storage utilizes an encoding protocol comprising a set of rules defining the translation of custom objects in the first data storage subsystem to custom objects in the second data storage subsystem.

11. The computer-implemented method of claim 10, wherein the encoding protocol comprises at least a set of rules for translating the names of fields and picklists of the first data storage to the equivalent in the second data storage.

12. The computer-implemented method of claim 1, further comprising prior to obtaining additional second data storage information, encoding first data storage data object metadata to second data storage data object metadata.

13. The computer-implemented method of claim 1, further comprising encoding first data storage data object metadata to second data storage data object metadata using a rules-based encoding protocol.

14. The computer-implemented method of claim 1, wherein the encoding protocol comprises rules for conversion to respective standard naming conventions.

15. The computer-implemented method of claim 1, wherein the additional second data storage information includes a second data storage data object metadata.

16. The computer-implemented method of claim 15, wherein the second data storage data object metadata includes at least one of: layouts, settings, or permissions.

17. The computer-implemented method of claim 1, wherein the data encoding interface is platform independent.

18. A system for platform independent migration of secure customer data, comprising:
   a first data storage, wherein the first data storage includes a first database schema and a first access language;
   a second data storage, wherein the second data storage includes a second database schema and a second access language, wherein the first data storage is distinct from the second data storage, the first database schema is distinct from the second database schema, and the first access language is distinct from the second access language;
   a translation controller that establishes optimum execution of first data storage access by parsing a set of queries using an optimization component and analyzing interdependencies to reduce query processing time and resource utilization;
      analyzes the set of queries in the first access language and generates a hierarchical representation of the set of queries to define the structure of the first access language;
      encodes the set of queries into encoded data in the second access language associated with the second data storage;
      analyzes the encoded data in the second access language and generates a hierarchical representation of the encoded set of queries to define the structure of the second access language;
      obtains additional second data storage information and combines the hierarchical representation of the encoded data in the second access language to generate a translated set of queries in the second access language; and
      sends the translated set of queries in the second access language to a data encoding interface to execute the migration of secure customer data from the first data storage to the second data storage.

19. A synchronization server for platform independent migration of secure customer data from a first data storage to a second data storage, the server comprising:
   a translation controller that:
      establishes optimum execution of a first data storage access by parsing a set of queries in a first access language using an optimization component and analyzing interdependencies to reduce query processing time and resource utilization;
      analyzes the set of queries in the first access language and generates a hierarchical representation of the set of queries to define the structure of the first access language;
      encodes the set of queries into encoded data in a second access language associated with the second data storage; and
      analyzes the encoded data in the second access language and generates a hierarchical representation of the encoded set of queries to define the structure of the second access language;
      obtains additional second data storage information and combines the hierarchical representation of the encoded data in the second access language to generate a translated set of queries in the second access language; and
   an authentication controller that:
      receives a request for secure customer data from the first data storage or second data storage;
      obtains an authentication factor for the request for secure customer data, wherein the authentication factor includes details specifying where the request for secure customer data is trying to access; and
      determines if the request for secure customer data requires accessing the first data storage or the second data storage based on evaluating the obtained authentication factor.

* * * * *